Jan. 8, 1952　　　M. N. WEBER　　　2,581,990
LOAD TRANSMITTING MEANS FOR DYNAMOMETERS
Filed June 29, 1949　　　　　　　　　　2 SHEETS—SHEET 1

INVENTOR.
Milton N. Weber
BY
Barnes, Kisselle, Laughlin & Raisch
Attorneys.

Jan. 8, 1952 M. N. WEBER 2,581,990
LOAD TRANSMITTING MEANS FOR DYNAMOMETERS
Filed June 29, 1949 2 SHEETS—SHEET 2

INVENTOR.
Milton N. Weber
BY
Barnes, Kiesell, Laughlin & Kaisel
Attorneys.

Patented Jan. 8, 1952

2,581,990

UNITED STATES PATENT OFFICE 2,581,990

LOAD TRANSMITTING MEANS FOR DYNAMOMETERS

Milton N. Weber, Detroit, Mich., assignor of one-half to Herbert W. Link, Detroit, Mich.

Application June 29, 1949, Serial No. 102,071

1 Claim. (Cl. 73—134)

This invention relates to dynamometers and it has to do particularly with a load transmitting mechanism so that the torque load may be transmitted and gauged irrespective the direction of torque. As is well known to those versed in the art, a dynamometer is a machine which may be used for testing and gauging torque and one use is for testing engines. An electric dynamometer, for example, has a rotary element to which the engine is connected and a relatively stationary element to which torque of the rotary element is transmitted. The torque tends to move or turn the relatively stationary element and the torque transmitted can be ascertained as the resistance required to prevent such turning or movement.

The present invention has to do with means for so resisting the torque and for transmitting the torque and it is concerned particularly with an arrangement for transmitting the torque irrespective of the direction of rotation.

Structures made in accordance with the invention are disclosed in the accompanying drawings.

Figure 1:
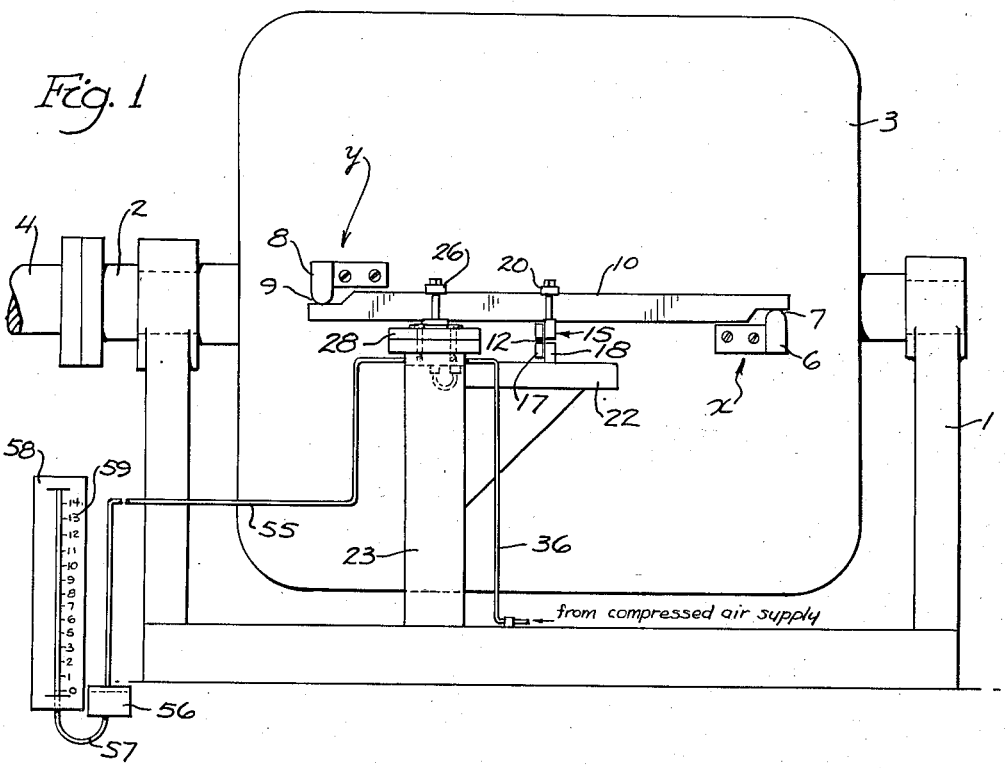
Fig. 1 is a general elevational view of the dynamometer showing the torque transmitting means of the present invention.
Figure 2:
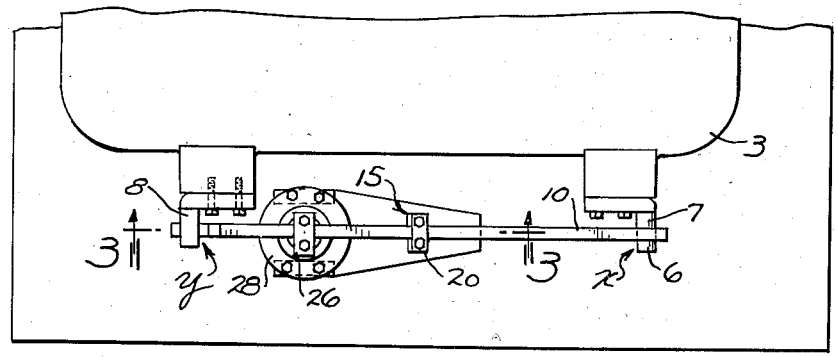
Fig. 2 is a partial top plan view.
Figure 5:
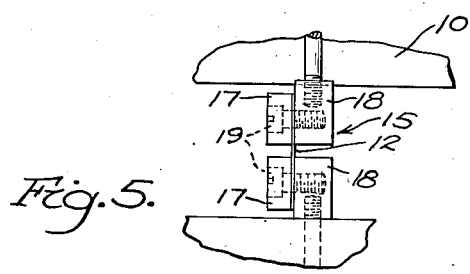
Fig. 5 is an enlarged detailed view showing a fulcrum member.

In Fig. 1, the general and basic elements of the dynamometer are indicated, these being a suitable support 1 in which the rotary element of the dynamometer is journalled, the element being shown at 2, and an exterior housing 3 which is the element to which torque is transmitted. The shaft of an engine, as shown at 4, may be connected to the rotary element 2. Suffice it to say that rotation of the member 2 transmits the torque thereof, to the housing 3.

The device of the present invention, preferably and advantageously, embodies a pneumatic or fluid pressure resister and a lever arrangement for transmitting the torque load thereto. There is a thrust piece or abutment 6 on the dynamometer preferably having a rounded surface 7 and a second and reversely positioned thrust piece 8 with a rounded surface 9 arranged to engage opposite ends of a lever 10. This lever is mounted for extremely slight movement with its rocking or pivotal action taking place incident to the flexing of a thin elastic sheet metal mounting. The device, as generally shown at 15, conveniently comprises a flat elastic metal strip or shim 12 having its opposite ends clamped between supporting blocks, and each supporting block may comprise two block elements 17 and 18 and screws 19 which pass through the elastic strip and connect the blocks with the elastic strip clamped therebetween. Preferably, the dimension of the elastic strip between the blocks is relatively short so that the fulcrum may resist compressive forces. For example, the distance between the blocks 15 and 16 may be about ¼" and the flexible member may be about .030" in thickness.

Figure 3:
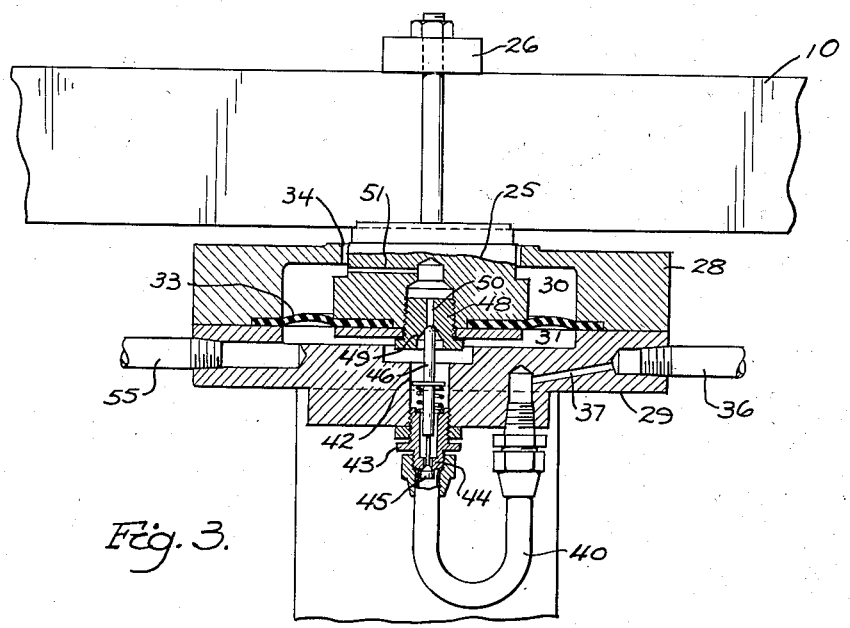
Fig. 3 is an enlarged cross sectional view of a fluid type torque balancing device.

The pneumatic device is illustrated in Fig. 3 and it comprises a plug member 25 fixedly secured to the lever arm 10 by means of a clamp 26. The device comprises a housing constituted by a housing element 28 and a housing element 29 fastened together to provide a chamber 30, and a chamber 31 separated by a diaphragm 33 clamped in position and connected to the plug 25. The plug 25 is freely movable relative to the housing, there being a clearance as at 34.

A suitable fluid, such as air, is supplied to the housing under the pressure through the conduit 36 and the passage 37 leads to a conduit 40 which connects in to the chamber 31 through a passage 42. For this purpose there is a suitable fitting 43 provided with a valve seat 44 and a valve member 45 is arranged to seat upon the valve seat 44. This member has a stem 46 which extends through the passage 42 and in the plug 25 is a member 48 having a valve seat 49 against which the end of the stem 46 is adapted to seat. Leading from the seat 49 is a port 50 which communicates with the chamber 30 through a passage or port 51. A conduit 55 connects into the chamber 31 and leads to a suitable pressure gauge, such as a manometer as shown in Fig. 1.

A simple form of manometer is shown and it is constituted by a reservoir 56 for mercury or suitable fluid and a tube 57 leading from the bottom thereof and then extending upwardly and adjacent the upwardly extending part of the tube is a body 58 with suitable indicia 59 thereon for indicating the pressure in suitable units such as a unit of weight. Such manometers are well known and suffice it to say that air under pressure entering the reservoir 56 moves the mercury column upwardly.

In considering the operation of the apparatus it may be assumed that the parts are positioned in Figs. 1 and 3 in a normal at rest or balanced condition. If the direction of rotation is such, that the torque load is delivered by the thrust piece 6, in an upward direction as Fig. 1 is viewed, and as shown by the arrow $x$, the lever 10 is shifted in a rocking manner. The link mounting 15 is placed under tension and the opposite end of the lever where it rests upon the plug 25 shifts downwardly. The lever thus acts as one of the first order. This shifts the plug 25 downwardly as Fig. 3 is viewed and the movement displaces the valve 45 from its seat allowing compressed air to enter the chamber 31 until the plug is shifted back to balanced position when the valve closes. The pressure required to do this may be read at the manometer. Should there be an over-movement of the plug and diaphragm or when the torque is relieved or lessened, the fluid pressure in chamber 31 shifts the plug upwardly as Fig. 3 is viewed, thus unseating the valve stem from the seat 49 and air is discharged through the port 51 and clearance 34. As the pressure lessens in the chamber 31 the diaphragm and plug move back until the valve stem seats on the seat 49 and the condition of equilibrium is attained.

Now, when the torque is reversed, the lever functions as a lever of the second order. The thrust piece 8 urges the left end of the lever downwardly as shown by the arrow $y$ and the lever fulcrums about the link 15 which is in tension, and the action pushes the plug and diaphragm downwardly thus letting in compressed air and the pneumatic unit functions as before described. In the arrangement shown, the lever 10 provides a mechanical advantage when functioning as a lever of the first order and is about an equal lever arrangement when it functions as a lever of the second order, but this can be varied as desired with appropriate adjustments made in the pressure reading.

Figure 4:
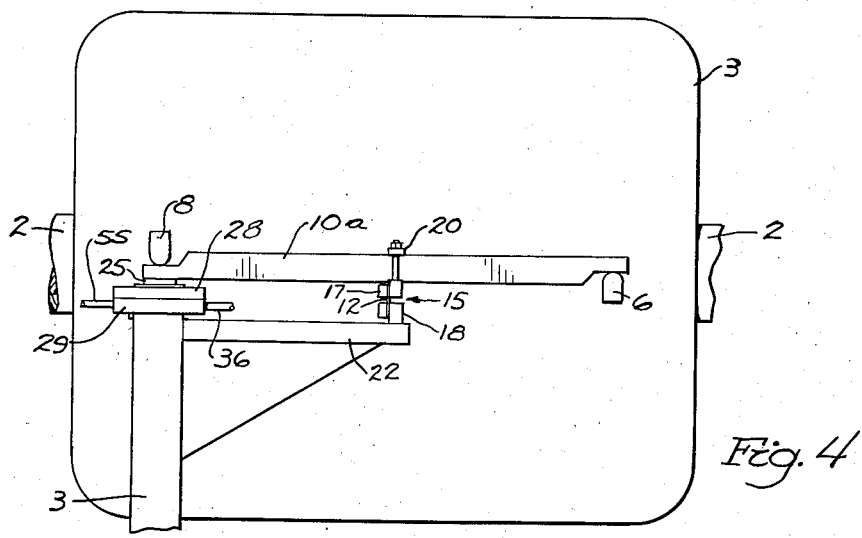
Fig. 4 is a view of modified arrangement of the torque transmitter.

In the modified form shown in Fig. 4, some of the parts have some of the same reference characters applied thereto, these being parts identical or similar to those previously described and the lever is shown at 10a. The pneumatic unit also has the same reference characters applied and the detail of the unit is as those shown in Fig. 3. In this case, one end of the lever may rest directly upon the plug 25 and need not be attached thereto. When the torque is in one direction the thrust piece 6 tends to move upwardly as Fig. 4 is viewed and the lever 10a acts as a lever of the first order with its opposite end pushing downwardly on the plug 25. When the torque is reversed the thrust piece 8 shifts downwardly directly upon the plug member 25 with the end of the lever interposed therebetween. In this case the thrust load on the diaphragm is the same irrespective of the direction of the torque since the lever 10a, as shown, is an equal balance lever offering no leverage disadvantage or advantage. Of course, when the thrust piece 8 urges downwardly the lever is rocked about its tension link 11 and the end of the lever adjacent the thrust piece 6 shifts merely free of the thrust piece 6.

Figure 6:
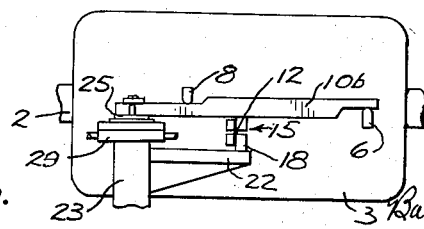
Fig. 6 is a view of a modified arrangement of torque transmitter.

In the modified form shown in Fig. 6, the thrust piece 6 engages the lever 10b adjacent one end and the thrust piece 8 engages the lever between the location of the fulcrum 15 and the plug member 25. When the thrust is upward on the lever by the thrust piece 6, the fulcrum is under tension and the lever functions as one of the first order. When the thrust is downward by the thrust piece 8, the fulcrum is under compression and the lever functions as one of the third order. However, even though a thin flexible piece of metal is employed, as the fulcrum, it will stand considerable compression because of the relatively short length of the effective part of the flexible member between its two block supports.

I claim:

In a dynamometer to which torque is to be transmitted and having a body arranged so as to tend to shift in one direction and in the opposite direction depending upon the direction of the torque transmitted thereto, two spaced oppositely facing thrust members on the body, a fixed support, a lever, a flexible thin metallic element fixedly secured to the support and to the lever and having a portion thereof between the fixed support and the lever and constituting a fulcrum, said fulcrum being located intermediate the ends of the lever, one of the thrust members being normally in substantial engagement with one side of the lever and on one side of the fulcrum, the other thrust member being normally in substantial engagement with the opposite side of said lever and on the opposite side of said fulcrum, and a fluid pressure balancing means operatively associated with the lever and arranged to be actuated upon lever movement to admit fluid under pressure and to exhaust fluid under pressure depending upon the direction of movement of the lever to balance the torque transmitted to the body.

MILTON N. WEBER.

REFERENCES CITED

The following references are of record in the file of this patent:

UNITED STATES PATENTS

| Number | Name | Date |
|---|---|---|
| 1,898,534 | Hartley | Feb. 21, 1933 |
| 2,377,889 | La Coste et al. | June 12, 1945 |
| 2,493,012 | Moore et al. | Jan. 3, 1950 |